(12) United States Patent  
Avrukin et al.

(10) Patent No.: US 10,740,260 B2  
(45) Date of Patent: Aug. 11, 2020

(54) CACHE SELF-CLEAN ENGINE

(71) Applicant: LG ELECTRONICS INC., Seoul (KR)

(72) Inventors: Arkadi Avrukin, Santa Clara, CA (US); Seungyoon Song, Santa Clara, CA (US); Yongjae Hong, Santa Clara, CA (US); Michael Frank, Santa Clara, CA (US); Hoshik Kim, Seoul (KR); Jungsook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/098,789

(22) PCT Filed: May 12, 2017

(86) PCT No.: PCT/KR2017/004957  
§ 371 (c)(1),  
(2) Date: Nov. 2, 2018

(87) PCT Pub. No.: WO2017/196132  
PCT Pub. Date: Nov. 16, 2017

(65) Prior Publication Data  
US 2019/0129849 A1 May 2, 2019

Related U.S. Application Data

(60) Provisional application No. 62/335,652, filed on May 12, 2016.

(51) Int. Cl.  
*G06F 12/00* (2006.01)  
*G06F 13/16* (2006.01)  
(Continued)

(52) U.S. Cl.  
CPC ........ *G06F 13/1673* (2013.01); *G06F 3/0658* (2013.01); *G06F 12/084* (2013.01);  
(Continued)

(58) Field of Classification Search  
CPC .. G06F 13/1673; G06F 13/40; G06F 13/4234; G06F 12/0804; G06F 2212/1032; G06F 2212/602; Y02D 10/14  
See application file for complete search history.

(56) References Cited

U.S. PATENT DOCUMENTS 6,134,634 A * 10/2000 Marshall, Jr. ....... G06F 12/0804  
711/141  
2007/0143548 A1 6/2007 Nakanishi et al.  
(Continued)

OTHER PUBLICATIONS

PCT International Application No. PCT/KR2017/004957, Notification of Transmittal of the International Search Report and the Written Opinion of the International Searching Authority, or Declaration dated Sep. 21, 2017, 12 pages.

*Primary Examiner* — Arvind Talukdar  
(74) *Attorney, Agent, or Firm* — Lee, Hong, Degerman, Kang & Waimey

(57) ABSTRACT

The present invention relates Control circuitry that includes a circuit configured to receive a system level cache (SLC) dirty-set request comprising a dirty set flag, a memory address, and an address of a cache line (LA) in a SLC data array. The circuitry converts the memory address to a dynamic random-access memory (DRAM) page address (PA) which identifies a DRAM bank and a DRAM page and identifies either a hit, or no hit, is present according to whether the DRAM PA matches with PA address in any valid entry in a dirty line links cache (DLL$).

17 Claims, 20 Drawing Sheets

(51) Int. Cl.
  *G06F 13/40*      (2006.01)
  *G06F 13/42*      (2006.01)
  *G06F 12/0804*    (2016.01)
  *G06F 3/06*       (2006.01)
  *G06F 12/084*     (2016.01)
  *G06F 12/0862*    (2016.01)
  *G06F 12/0897*    (2016.01)
  G06F 15/78        (2006.01)

(52) U.S. Cl.
  CPC ...... *G06F 12/0804* (2013.01); *G06F 12/0862* (2013.01); *G06F 12/0897* (2013.01); *G06F 13/40* (2013.01); *G06F 13/4234* (2013.01); *G06F 15/7807* (2013.01); *G06F 2212/1032* (2013.01); *G06F 2212/602* (2013.01); *G06F 2212/608* (2013.01); *Y02D 10/14* (2018.01); *Y02D 10/151* (2018.01)

(56) References Cited

U.S. PATENT DOCUMENTS

| | | | |
|---|---|---|---|
| 2008/0209112 A1* | 8/2008 | Yu | G06F 12/0246 711/103 |
| 2010/0205367 A1 | 8/2010 | Ehrlich et al. | |
| 2012/0203968 A1* | 8/2012 | Daly | G06F 12/0804 711/122 |
| 2013/0124802 A1 | 5/2013 | Glasco et al. | |
| 2013/0205089 A1 | 8/2013 | Soerensen et al. | |
| 2014/0258601 A1 | 9/2014 | Ware et al. | |
| 2015/0089154 A1* | 3/2015 | Busaba | G06F 12/0815 711/141 |

\* cited by examiner

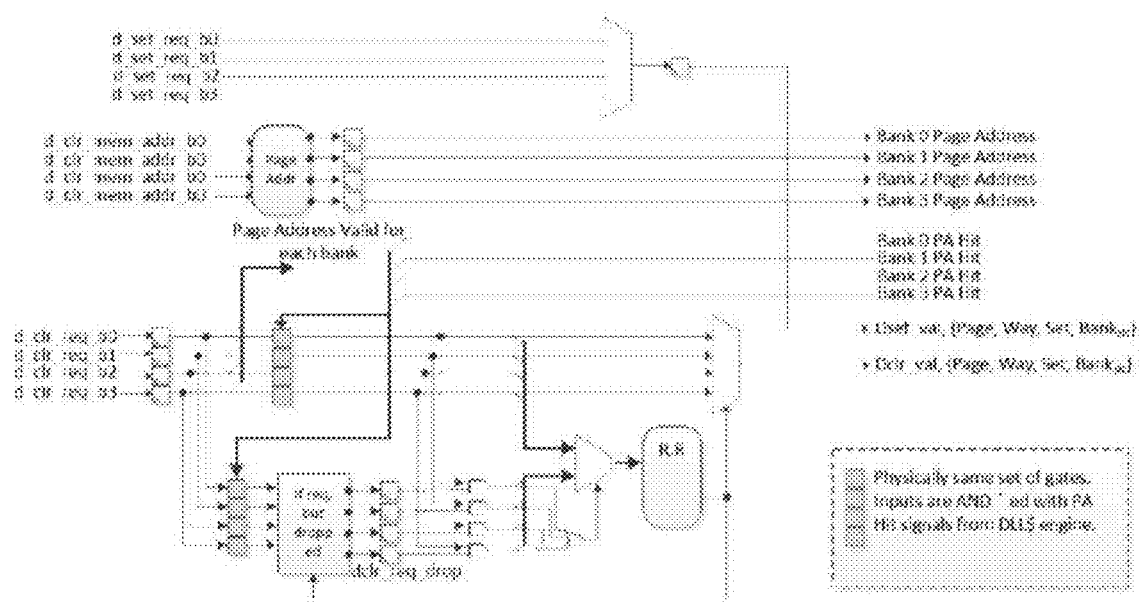
Fig. 3
Fig. 4

| reg_rank | Rank Address Bit Position |
|---|---|
| 0 | [15] |
| 1 | [31] |
| 2 | [30] |
| 3 | [29] |
| 4 | [28] |
| default | rank address bit is always zero |

Fig. 5

| row_rank | Row Address Bit Position |
|---|---|
| 0 | [30:16] |
| 1 | [29:16] |
| 2 | [28:16] |
| 3 | [30:15] |
| 4 | [29:15] |
| 5 | [28:15] |
| 6 | [27:15] |
| default | [31:16] |

| Offset | Access | Reset | Width | Description |
|---|---|---|---|---|
| 0x00 | R / W | 0x0 | 32 | CTRL – Control Register |
| 0x04 | R / W | 0x234 | 32 | PDTHLD – Threshold for DLL$<br><br>This register is used to define the number of dirty sectors associated with DDR page which will cause DLL$ to generate flush request. The maximum value the number can represent is equal to the maximum capacity of DLL$ entry, which is not bigger than 16 (for 4KB DDR pages) and 4 bits is enough to represent it. For example, if DSL$ entry has 6 slots for sector addresses, recommended value for PDTHLD will be 4.<br><br>Three different 4-bit fields are defined and one of the three PDTHLD is selected according to how many DLL$ entries are used (refer 1.1.2). |
| 0x08 | R / W | 0x1000 | 32 | PMAXAGE – Maximum Age Value for DLL$<br><br>The value in this register specifies the maximum number of requests for which an Entry in DLL$ is allowed not to hit. If aan entry hasn't experienced a hit for that number of accesses, it is evicted if allocation is required and there are no available entries in DLL$. |

Fig. 15

| Signal | Width | Direction | Description |
|---|---|---|---|
| paddr | 8 | Input | APB address signal |
| psel | 1 | Input | APB select signal |
| penable | 1 | Input | APB enable signal |
| pwrite | 1 | Input | APB write signal |
| pwdata | 32 | Input | APB write data signal |
| pready | 1 | Output | APB ready signal |
| prdata | 32 | Output | APB read data signal |

Fig. 16

| Signal | Direction | Description |
|---|---|---|
| reg_bank[2:0] | Input | DMC Bank Configuration<br>'b000 - [15:13] (LPDDR3)<br>'b001 - [14:12]<br>'b010 to 'b111 - [11:9] |
| reg_rank[2:0] | Input | DMC Rank Configuration<br>'b000 - [15]<br>'b001 - [31]<br>'b010 - [30]<br>'b011 - [29]<br>'b100 - [28]<br>'b101 to 'b111 - Reserved (LPDDR3) |
| reg_row[3:0] | Input | DMC Row Configuration<br>'b0000 - [30:16]<br>'b0001 - [29:16]<br>'b0010 - [28:16]<br>'b0011 - [30:15]<br>'b0100 - [29:15]<br>'b0101 - [28:15]<br>'b0110 - [27:15]<br>'b0111 to 'b1111 - [31:16] |
| reg_ddrch[1:0] | Input | DMC Internal Channel Configuration<br>'b00 - [8]<br>'b01 to 'b11 - Reserved |
| reg_2ranken | Input | 2RANKEN Control<br>0 - Each DMC channel has 1 rank<br>1 - Each DMC channel has 2 ranks |
| reg_2chen | Input | 2CHEN Control<br>0 - Each SLC cluster is connected to 1 channel DMC<br>1 - Each SLC cluster is connected to 2 channel DMC |
| reg_swizzle | Input | SWIZZLE Control<br>0 - swizzle is disabled<br>1 - swizzle is enabled |
| reg_chswzi_enable | Input | Channel Swizzle Control<br>0 - swizzle is disabled<br>1 - swizzle is enabled |
| reg_chswzi_sel[1:0] | Input | Channel Swizzling Bit Selection Control<br>0 - [9] if reg_bank == 1, [12] if reg_bank == 2<br>1 - [10] if reg_bank == 1, [13] if reg_bank == 2<br>2 - [11] if reg_bank == 1, [14] if reg_bank == 2<br>3 - [9] if reg_bank == 1, [12] if reg_bank == 2 |

Fig. 17

| Signal | Width | Direction | Description |
| --- | --- | --- | --- |
| Tpc0_sc_dset_mem_addr | SLC_CL_ADDR_WIDTH | Input | SLC mem address for bank 0 |
| Tpc0_sc_dset_set_way | SLC_SETWAY_WIDTH | Input | SLC line address for bank 0 |
| Tpc0_sc_dset_val | 1 | Input | SLC dirty-set request for bank 0 |
| Tpc0_sc_dclr_mem_addr | SLC_CL_ADDR_WIDTH | Input | SLC mem address for bank 0 |
| Tpc0_sc_dclr_set_way | SLC_SETWAY_WIDTH | Input | SLC line address for bank 0 |
| Tpc0_sc_dclr_val | 1 | Input | SLC dirty-clear request for bank 0 |
| Tpc1_sc_dset_mem_addr | SLC_CL_ADDR_WIDTH | Input | SLC mem address for bank 1 |
| Tpc1_sc_dset_set_way | SLC_SETWAY_WIDTH | Input | SLC line address for bank 1 |
| Tpc1_sc_dset_val | 1 | Input | SLC dirty-set request for bank 1 |
| Tpc1_sc_dclr_mem_addr | SLC_CL_ADDR_WIDTH | Input | SLC mem address for bank 1 |
| Tpc1_sc_dclr_set_way | SLC_SETWAY_WIDTH | Input | SLC line address for bank 1 |
| Tpc1_sc_dclr_val | 1 | Input | SLC dirty-clear request for bank 1 |
| Tpc2_sc_dset_mem_addr | SLC_CL_ADDR_WIDTH | Input | SLC mem address for bank 2 |
| Tpc2_sc_dset_set_way | SLC_SETWAY_WIDTH | Input | SLC line address for bank 2 |
| Tpc2_sc_dset_val | 1 | Input | SLC dirty-set request for bank 2 |
| Tpc2_sc_dclr_mem_addr | SLC_CL_ADDR_WIDTH | Input | SLC mem address for bank 2 |
| Tpc2_sc_dclr_set_way | SLC_SETWAY_WIDTH | Input | SLC line address for bank 2 |
| Tpc2_sc_dclr_val | 1 | Input | SLC dirty-clear request for bank 2 |
| Tpc3_sc_dset_mem_addr | SLC_CL_ADDR_WIDTH | Input | SLC mem address for bank 3 |
| Tpc3_sc_dset_set_way | SLC_SETWAY_WIDTH | Input | SLC line address for bank 3 |
| Tpc3_sc_dset_val | 1 | Input | SLC dirty-set request for bank 3 |
| Tpc3_sc_dclr_mem_addr | SLC_CL_ADDR_WIDTH | Input | SLC mem address for bank 3 |
| Tpc3_sc_dclr_set_way | SLC_SETWAY_WIDTH | Input | SLC line address for bank 3 |
| Tpc3_sc_dclr_val | 1 | Input | SLC dirty-clear request for bank 3 |

Fig. 18

| Signal | Width | Direction | Description |
|---|---|---|---|
| Sc_sc2clu_line | SLC_SETWAY_WIDTH | Output | Flush request line address (Set+Way) |
| Sc_sc2clu_bank | 2 | Output | Flush request bank address (Bank0 – Bank3) |
| Sc_sc2clu_req | 1 | Output | Flush request; validating address |
| Sc2clu_sc_ack | 1 | Input | SC request was accepted |

Fig. 19

| Event | Bit | Description |
|---|---|---|
| e_dset_recv | [0] | triggered when one of banks in a cluster sends dirty-set request to the self-clean engine |
| e_dset_drop | [1] | triggered when dirty-set request dropped because DLL$ doesn't have an available entry to store the request |
| e_dclr_b0_recv | [2] | set HIGH when SC receives a dirty-clear request from bank 0 |
| e_dclr_b1_recv | [3] | set HIGH when SC receives a dirty-clear request from bank 1 |
| e_dclr_b2_recv | [4] | set HIGH when SC receives a dirty-clear request from bank 2 |
| e_dclr_b3_recv | [5] | set HIGH when SC receives a dirty-clear request from bank 3 |
| e_dclr_b0_drop | [6] | set HIGH when SC drops a dirty-clear request from bank 0 because it misses in DLL$ entries or lost in arbitration |
| e_dclr_b1_drop | [7] | set HIGH when SC drops a dirty-clear request from bank 1 because it misses in DLL$ entries or lost in arbitration |
| e_dclr_b2_drop | [8] | set HIGH when SC drops a dirty-clear request from bank 2 because it misses in DLL$ entries or lost in arbitration |
| e_dclr_b3_drop | [9] | set HIGH when SC drops a dirty-clear request from bank 3 because it misses in DLL$ entries or lost in arbitration |
| e_dclr_flush_drop | [10] | triggered when a self-clean flush request generated from dirty-clean request hit to one of the entries dropped because FIFO does not have any available space |
| e_old_enty_disc | [11] | triggered when an entry discarded because it reaches to the maximum age and there is no available entry in DLL$ |
| e_dclr_hit | [12] | triggered when dirty-clean request gets hit to any one of entries in DLL$ |
| e_dclr_miss | [13] | triggered when dirty-clean request received by DLL$ after the filtering in D-Up Arbiter but the request misses to DLL$ entries |
| e_thld | [14] | triggered when any of DLL$ entries reaches to the threshold value configured |
| e_flush_n_1 | [15] | triggered when a dirty-clean request flushes one of DLL$ entries and the entry contains one valid slot |
| e_flush_n_2_4 | [16] | triggered when a dirty-clean request flushes one of DLL$ entries and the entry contains the number of valid slots between 2 and 4 |
| e_flush_n_5_8 | [17] | triggered when a dirty-clean request flushes one of DLL$ entries and the entry contains the number of valid slots between 5 and 8 |

Fig. 20

CACHE SELF-CLEAN ENGINE

CROSS-REFERENCE TO RELATED APPLICATIONS

This application is the National Stage filing under 35 U.S.C. 371 of International Application No. PCT/KR2017/004957, filed on May 12, 2017, which claims the benefit of U.S. Provisional Application No. 62/335,652, filed on May 12, 2016, the contents of which are all hereby incorporated by reference herein in their entirety.

TECHNICAL FIELD

The present invention generally relates to device memory, and in particular, to controlling system level cache (SLC) requests.

BACKGROUND ART

A cache is a component that transparently stores data so that future requests for that data can be served faster. The data that is stored within a cache might be values that have been computed earlier or duplicates of original values that are stored elsewhere. If requested data is contained in the cache (i.e., cache hit), this request can be served by simply reading the cache, which is comparatively faster. Otherwise (i.e., cache miss), the data must be fetched from its original storage location, which is comparatively slower. Prefetching is the operation of loading data or instructions in cache in anticipation of their need. Thus, the greater the number of requests that can be served from the cache, the faster the overall system performance. Data in the cache which matches the data in a corresponding memory location is called clean data; and data in the cache which does not match the data in a corresponding memory location is called dirty data.

DISCLOSURE OF INVENTION

Technical Problem

In accordance with an embodiment, control circuitry includes a circuit configured to receive a system level cache (SLC) dirty-set request comprising a dirty set flag, a memory address, and an address of a cache line (LA) in a SLC data array; a circuit configured to convert the memory address to a dynamic random-access memory (DRAM) page address (PA) which identifies a DRAM bank and a DRAM page; and a circuit configured to identify either a hit, or no hit, is present according to whether the DRAM PA matches with PA address in any valid entry in a dirty line links cache (DLL$).

In accordance with another embodiment, control circuitry includes a circuit configured to receive a system level cache (SLC) dirty-clear request comprising a dirty clear flag, a memory address, and an address of a cache line (LA) in a SLC data array; a circuit configured to convert the memory address to a dynamic random-access memory (DRAM) page address (PA) which identifies a DRAM bank and a DRAM page; a circuit configured to identify either a hit, or no hit, is present according to whether the DRAM PA matches with the PA address in any valid entry in a dirty line links cache (DLL$); and a circuit configured to perform, when no hit is present, dropping the system level cache (SLC) dirty-clear request.

These and other embodiments will also become readily apparent to those skilled in the art from the following detailed description of the embodiments having reference to the attached figures, the invention not being limited to any particular embodiment disclosed.

Solution to Problem

In one embodiment, A control circuitry, comprising: a circuit configured to receive a system level cache (SLC) dirty-set request comprising a dirty set flag, a memory address, and an address of a cache line (LA) in a SLC data array; a circuit configured to convert the memory address to a dynamic random-access memory (DRAM) page address (PA) which identifies a DRAM bank and a DRAM page; and a circuit configured to identify either a hit, or no hit, is present according to whether the DRAM PA matches with PA address in any valid entry in a dirty line links cache (DLL$).

In another embodiment, the control circuitry further comprising: a circuit configured to perform, when no hit is present, and no entry in the DLL$ is available, and there are entries in the DLL$ with a count (CNT) less than specified max number minus 1 (MAX_CNT−1), occupying an entry in the DLL$ having an age greater than a specified max age value (MAX_AGE), else occupying an entry in the DLL$ having a count (CNT) equal to 1 and an age greater than MAX_AGE/2.

In another embodiment, the control circuitry further comprising: a circuit configured to perform, when no hit is present, and no entry in the DLL$ is available, and there are entries in the DLL$ with a count (CNT) less than specified max number minus 1 (MAX_CNT−1), and there is either no entry in the DLL$ having an age greater than the specified max age value (MAX_AGE), or there is no entry with the count (CNT) equal to 1 and an age greater than MAX_AGE/2, dropping the system level cache (SLC) dirty-set request.

In another embodiment, the control circuitry further comprising: a circuit configured to perform, when no hit is present, and no entry in the DLL$ is available, and there is an entry in the DLL$ with a count (CNT) greater or equal to a specified max number minus 1 (MAX_CNT−1), and a FIFO is not available, dropping the system level cache (SLC) dirty-set request.

In another embodiment, the control circuitry further comprising: a circuit configured to perform, when no hit is present, and no entry in the DLL$ is available, and there is an entry in the DLL$ with a count (CNT) greater or equal to a specified max number minus 1 (MAX_CNT−1), and the FIFO is available, copying content of the entry of the DLL$ entry to the FIFO, and occupy the DLL$ entry.

In another embodiment, the control circuitry further comprising: a circuit configured to perform, when no hit is present, and there is an available entry in the DLL$, occupy the available entry in the DLL$.

In another embodiment, the control circuitry further comprising: a circuit configured to perform, when the hit is present, and a count (CNT) value of the hit entry is less than a specified max number minus 1 (MAX_CNT−1), adding the address of the cache line (LA) of the dirty set request to this entry of DLL$.

In another embodiment, the control circuitry further comprising: a circuit configured to perform, when the hit is present, and the count (CNT) value of the hit entry is equal to the specified max number minus 1 (MAX_CNT−1), and the FIFO is not available, adding the address of the cache line (LA) of dirty set request to this entry of the DLL$.

In another embodiment, the control circuitry further comprising: a circuit configured to perform, when the hit is present, and the count (CNT) value of the hit entry is equal to the specified max number minus 1 (MAX_CNT−1), and the FIFO is not available, copy content of the entry of the DLL$ to the FIFO and send the cache line (LA) of the dirty set request to the FIFO, and clear the entry of the DLL$.

In another embodiment, the control circuitry further comprising: a circuit configured to perform, when the hit is present, and the count (CNT) value of the hit entry is equal to the specified max number (MAX_CNT), and the FIFO is not available, drop the system level cache (SLC) dirty-set request, and clear this entry.

In another embodiment, the control circuitry further comprising: a circuit configured to perform, when the hit is present, and the count (CNT) value of the hit entry is equal to the specified max number (MAX_CNT), and the FIFO is available, copy content of the entry of the DLL$ to the FIFO and send the cache line (LA) of the dirty set request to the FIFO, and clear the entry of the DLL$.

In another embodiment, the control circuitry further comprising: a circuit configured to perform, when a hit is present, and the count (CNT) of the hit entry is 1, clear the entry of the DLL$.

In another embodiment, the control circuitry further comprising: a circuit configured to perform, when a hit is present, and the count (CNT) of the hit entry is greater than 1, and the FIFO is available, copy content of the entry of the DLL$ to the FIFO and clear the entry of this entry of the DLL$.

In another embodiment, the control circuitry further comprising: a circuit configured to perform, when there are no system level cache (SLC) requests, either dirty-set requests or dirty clear requests, analyzing counter values of all entries of the DLL$, and if an entry is found with a counter that is equal or greater than the specified max value (CNT>=MAX_CNT), and the FIFO is available, copy content of the entry of the DLL$ to the FIFO and clear the entry of the DLL$.

In another embodiment, the control circuitry further comprising: a circuit configured to perform, when no hit is present, incrementing an age of an entry in the DLL$.

In another embodiment, wherein each entry of the DLL$ comprises a parameter for age, count (CNT), page address (PA), and an address of a cache line (LA), and wherein the adding the address of the cache line (LA) includes incrementing the count (CNT) and clearing the age.

In another embodiment, wherein each entry of the DLL$ comprises a parameter for age, count (CNT), page address (PA), and an address of a cache line (LA), and wherein the occupying the available entry in the DLL$ includes putting the address of the cache line (LA) in a first slot of the entry, setting the entry as valid, putting the page address in the page address (PA), resetting the age, and setting the count (CNT) to 1.

In another embodiment, wherein each entry of the DLL$ comprises a parameter for age, count (CNT), page address (PA), and an address of a cache line (LA), and wherein the clearing the entry of the DLL$ includes setting the entry as not occupied, resetting the age, and setting the count (CNT) to 1.

In another embodiment, a control circuitry, comprising: a circuit configured to receive a system level cache (SLC) dirty-clear request comprising a dirty clear flag, a memory address, and an address of a cache line (LA) in a SLC data array; a circuit configured to convert the memory address to a dynamic random-access memory (DRAM) page address (PA) which identifies a DRAM bank and a DRAM page; a circuit configured to identify either a hit, or no hit, is present according to whether the DRAM PA matches with the PA address in any valid entry in a dirty line links cache (DLL$); and a circuit configured to perform, when no hit is present, dropping the system level cache (SLC) dirty-clear request.

BRIEF DESCRIPTION OF DRAWINGS

The above and other aspects, features, and advantages of the present invention will become more apparent upon consideration of the following description of preferred embodiments, taken in conjunction with the accompanying drawing figures.

FIG. 3 is a block diagram showing a D-update arbiter in accordance with an embodiment of the present invention.

FIG. 4 is an example of the structure of a D-update memory address.

FIG. 5 is a table providing an example of a DRAM rank address configuration.

FIG. 6 is a table providing an example of a DRAM row address configuration.

FIG. 15 depicts a table showing self-clean (SC) registers in offset order from the base memory address.

FIG. 16 is a table showing examples of register interface signals.

FIG. 17 is a table that depicts examples of DRAM memory address configurations that may be implemented in an embodiment of the present invention.

FIG. 18 is a table that depicts examples of SLC observation signals that may be implemented in an embodiment of the present invention.

FIG. 19 is a table that depicts examples of flush request interface signals that may be implemented in an embodiment of the present invention.

FIG. 20 is a table that depicts examples of self-clean event signals that may be implemented in an embodiment of the present invention.

BEST MODE FOR CARRYING OUT THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
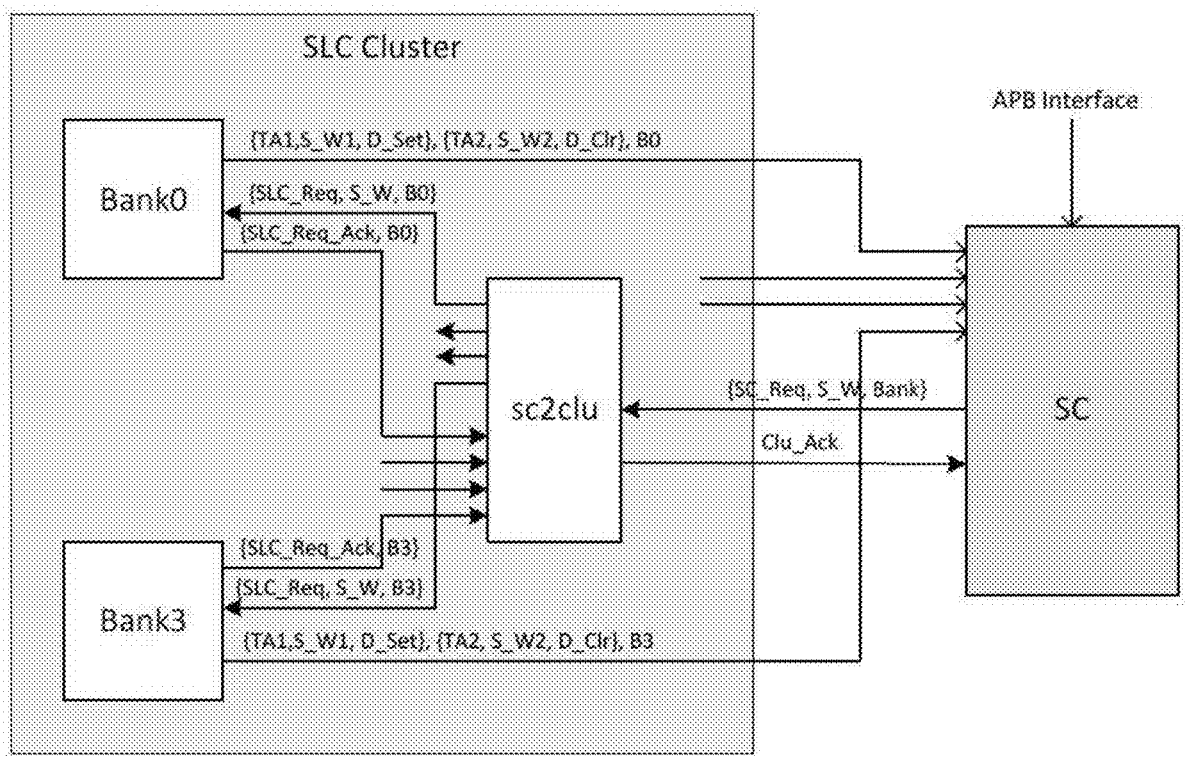
FIG. 1 is a block diagram showing a self-clean (SC) engine and a system level cache (SLC) cluster.

FIG. 1 is a block diagram showing a self-clean (SC) engine and a system level cache (SLC) cluster. In accordance with an embodiment, the SC engine may be implemented to achieve a twofold purpose. One is to help replacement logic find non-dirty cache lines in a set, thus avoiding write-to-read and read-to-write switching on the DDR bus and a write back at an inconvenient moment (e.g., when a read miss happens). A second purpose is to group several writes to the same DDR page to increases DDR efficiency.

The first goal may be accomplished by utilizing a dirty threshold function inside each tag pipeline of the SC engine. The second goal may be achieved by using the cache of DRAM pages linked to the SLC dirty cache lines (DLL$ —Dirty Line Links cache) in the SC engine.

The SLC includes 8 banks, split into 2 clusters with 4 banks per cluster. Each cluster is connected to the associated DRAM Controller. The SC engine is generally dedicated to a cluster, so there are two SCEs in the SLC. FIG. 1 shows communication between banks in the SLC cluster and the SC engine.

Each bank typically has up to two D-flag updates per cycle. This happens when a write (causing D-Set) is accompanied with eviction (causing D-Clear). The information about the D-flag update is accompanied with the memory address and the location in the SLC. Memory address points to a 64-byte cache line sector memory location and includes a tag portion (TA) and a Set/Bank. Location in the SLC is determined by Set/Way/Bank information (S_W, Bank).

The SLC requests which can generate D-flag updates (in addition to the self-clean requests themselves). Typical D-flag updates include a write (2 updates—D-Set and D-Clear); read (1 update—D-clear); and prefetch (1 update—D-Clear). The SLC cluster may be designed to have only one type of each of these requests per cycle. As such, collectively, the SC engine can receive 1 D-set update signal and 3 D-clear update signals. Note that the D-flag changes caused by self-clean requests are usually not made visible to the SC engine.

Figure 2:
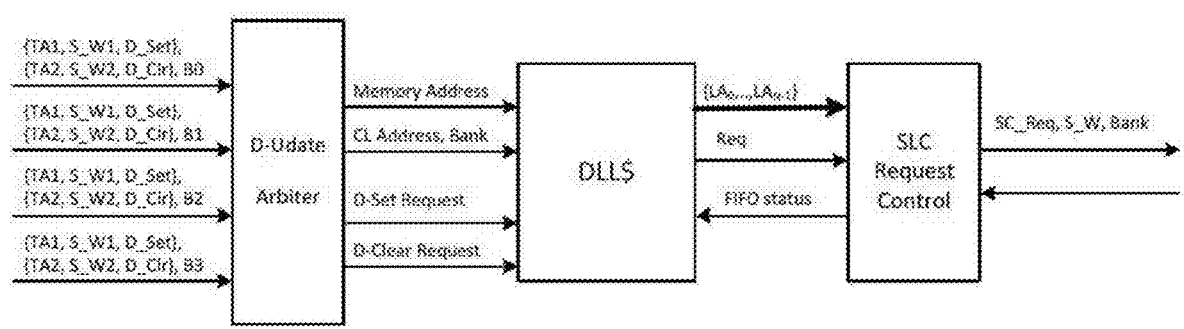
FIG. 2 is a block diagram showing components of a typical self-clean engine.

FIG. 2 is a block diagram showing components of a typical self-clean engine. The D-update arbiter selects one of the dirty-clear requests and passes it to DLL$. SLC sends only one dirty-set request at a time so it is always sent to DLL$.

FIG. 3 is a block diagram showing a D-update arbiter in accordance with an embodiment of the present invention. the D-Update arbiter receives dirty flag update requests from 4 banks in a SLC cluster. Typically, one dirty-set update signal and three dirty clear update signals can be received. Because only one dirty-set request arrives to the self-clean engine at a time, a dirty-set request is usually directly passed to the DLL$. If more than one dirty-clean request is generated from four banks, one of the requests is selected according to its priority.

If dirty-clear requests from banks were dropped previously, these requests have higher priority over the requests that were not dropped. A round-robin selection scheme may be used to select one of the previously dropped bank requests. If all banks which are generating dirty-clean requests did not drop its request previously, one of the requests is selected by the round-robin scheme and the others will be dropped and recorded.

In an embodiment, up to three dirty-clear requests can be delivered to the D-update arbiter at the same clock cycle. Therefore, the arbiter discards the clear requests which are not hit to the DLL$. DLL$ will typically drop missed dirty-clean requests so this filtering operation helps the arbitration of D-update arbiter. If there are more than one clear request hit to the DLL$, only one request is selected and the remaining requests are dropped. The banks for which its requests were previously discarded are stored in the registers and they will have higher priority for the next arbitration. If there are more than one request that has the same priority, they can be selected in a round-robin manner.

DRAM page address may be calculated from its configuration signals. These signals decide where the DRAM address map would be located in a full request address such as rank, bank, row, and channel address. The D-update arbiter receives a memory address from each bank.

FIG. 4 is an example of the structure of an D-update memory address. Bank address bits are typically configured by a reg_bank control signal. When this signal is set to 0x0, the DRAM bank address bits are [15:13]. If set to 0x1, the bank address is located at bit [14:12] of the request address and the remaining portion of the configuration makes up the DRAM bank address bits to [11:9]. Note that these bit positions are based on a full request address which is {mem_addr, 6'b0}.

The bank address used for the DLL$ page address includes the DRAM bank address, rank address, and sub-channel address for the LPDDR4. When the SLC is connected to the LPDDR3 controller, the rank and sub-channel bit would be configured to zero by setting reg_2ranken and reg_2chen to zero. If the LPDDR4 controller is used and a dual rank address is considered, the rank_sel signal decides where the rank address bit is located.

FIG. 5 is a table providing an example of a DRAM rank address configuration. Recall that a sub-channel bit of the LPDDR4 is also a part of the page address. If reg_2chen is set to high, the address bit [8] is a sub-channel bit. When reg_2chen is set to low, the sub-channel bit stays zero.

The DLL$ page address includes a DRAM row and bank address (including rank and sub-channel bits). The DRAM row address is calculated by a reg_row configuration signal.

FIG. 6 is a table providing an example of a DRAM row address configuration. In this table, the DRAM row address is positioned according to the reg_row configurations.

Figure 7:
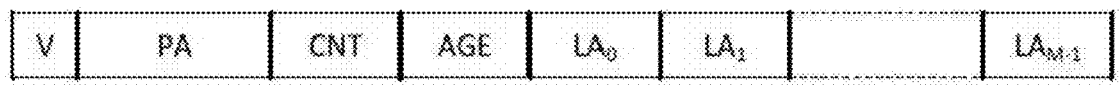
FIG. 7 is a structure of an entry in the DLL$.
Figure 8:
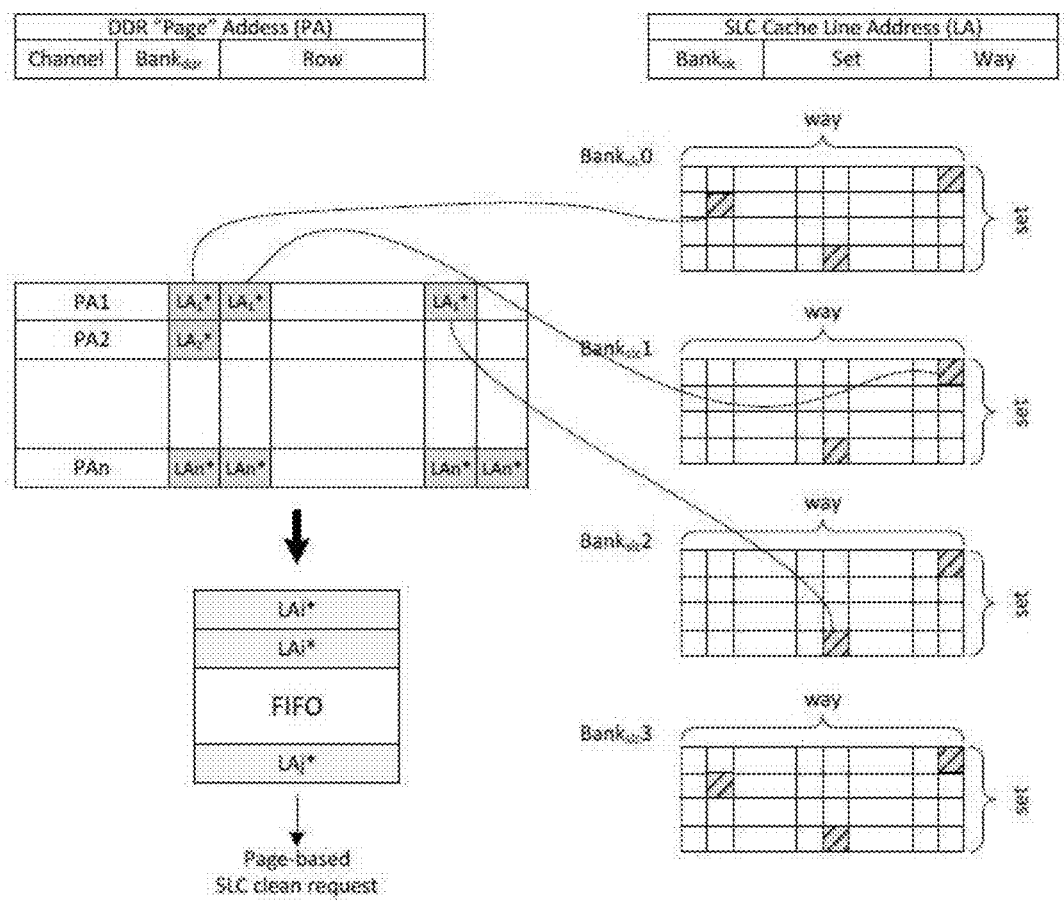
FIG. 8 is a diagram showing the cache of DRAM pages linked to dirty cache lines in the SLC.

FIG. 7 is a structure of an entry in the DLL$, and FIG. 8 is a diagram showing the cache of DRAM pages linked to dirty cache lines in the SLC.

As to FIG. 7. the V element is a valid bit for the entry, PA is the page address, LAi is the cache line address, CNT is the number of valid CL addresses in the entry, and AGE is the number of requests to DLL$ since the entry was last hit.

As shown in FIG. 8, dirty cache lines links cache, DLL$, stores information on DDR page addresses associated with dirty CLs (Cache Lines) in SLC. When the number of dirty CLs, pointing to the same DDR page reaches some value (specified in the register PDTHLD), the engine initiates flush requests to SLC, causing sequential writes from SLC to DDR with addresses targeting the same page (channel, bank and row).

Each time a dirty status of a CL in the SLC is changed, the SLC provides to the DLL$ address of this CL (LA) and the associated memory address. Based on the information of DDR configuration (received from control signal ports) the memory address is converted to the DDR page address, PA.

Once the page address is obtained, the DLL$ is searched for an entry with the same address. If a match is found (hit), the CL address is placed into an available slot in the entry allocated for this page. If a new page address is not hit in the DLL$, a new entry is allocated for this page, when possible.

When there is no room in the DLL$, it will look for entries with AGE>=MAX_AGE, or entries with AGE>=MAX_AGE/2 and CNT=1. If there are no such entries, the new request will be dropped.

Line addresses which belong to the same DLL$ slot have the same DDR Page Address and it means they have the same bank address of DDR memory. However, each LA could have a different SLC bank address in a cluster as described in FIG. 8.

The DLL$ is organized as an array of entries, where an entry is dedicated to a single DRAM page. An entry stores page address, PA, and a set of SLC cache line addresses which memory addresses point to the same DDR page.

Figure 9:
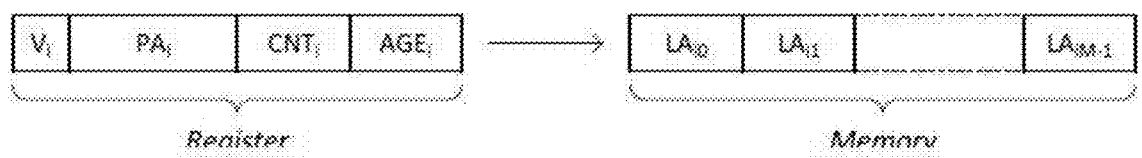
FIG. 9 depicts partitioning of a DLL$ entry structure.

FIG. 9 depicts partitioning of a DLL$ entry structure. In particular, the figure shows an entry split into two portions; a control portion (register) and a portion having the set of LA pointers (memory). The control portion contains a valid bit (V), page address (PA), counter (CNT) that represents the number of valid LA pointers, and the AGE value reflecting the time since the entry was last hit. The control portion is typically implemented using registers. This allows quick associative search while minimizing power. The LA pointer contains set, way and bank SLC addresses, and the set of LA pointer. The LA pointer set is usually stored in a dual-port memory.

The "i" term is the entry number out of N entries in the DLL$, and is also the index to the set of LA pointers in the dual-port memory, PDLA (Array of Pointers to Dirty Lines). The number of slots allocated to store line addresses (LAs) for an entry is shown as M. In an embodiment, each slot represents a 256 Byte CL and the size of the DDR page (row) is not more than 4 KB (2 KB in *DDR4), M should not be larger than 16 (8 for *DDR4). In some cases, M will be 8.

Figure 10:
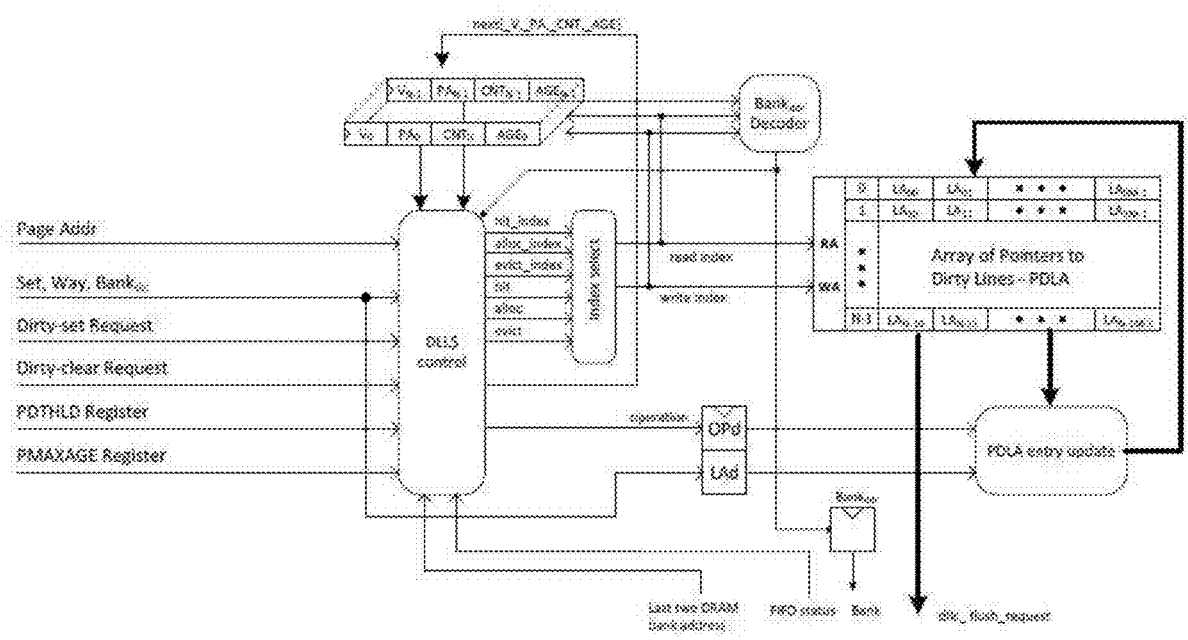
FIG. 10 is a block diagram of an example of the DLL$.

FIG. 10 is a block diagram of an example of the DLL$. As for the number of pages tracked by the DLL$, it generally is not less than a total number of banks in DDR in order to maximize efficiency. For example, if the SoC uses LPDDR3/4 and has two channels, there are 16 banks total and the number of entries, N, in DLL$ should thus not be less than 16. Since the size of the DLL$ is generally not too large, the number of entries will be a small multiple of that minimal number, for example 32, 64, or 128.

Tag Address, together with high order bits of a CL address participate in generating the DDR page address based on the settings in the configuration signal ports. These control signals reflect configurations which are used in the DRAM controller. Such signals may be used to scramble a memory address in defining the DDR bank address, and in the SoC infrastructure in defining DDR channels interleaving.

The DLL$ control logic detects whether there is a hit or miss in the cache, allocates an entry for new pages, and evicts older pages. It also decides when to flush the content of the PDLA into the FIFO, which can happen when the DLL$ receives a dirty-set or dirty-clear request, or in the absence of it, when an entry with the number of valid slots exceeding the value in PDTHLD register is found. The PDTHLD value is decided dynamically according to the number of DLL$ entries in use. Three DLL$ entry conditions can be defined as follows.

First, the number of entries in use is less than ½ of the number of DLL$ entries. Second, the number of entries in use is less than ¾ and more than or equal to ½ of the number of DLL$ entries. Third, the number of entries in use is more than or equal to ¾ of the number of the DLL$ entries.

As dirty-set request and dirty-clear request are able to arrive at the same time and both requests can cause the cache flush, the dirty-clear request has higher priority over the dirty-set request. Generally, the dirty-set causes the PDLA entry write and dirty-clear causes the PDLA entry read. The control portion can be updated at the same time as they are implemented as registers.

Figure 11:
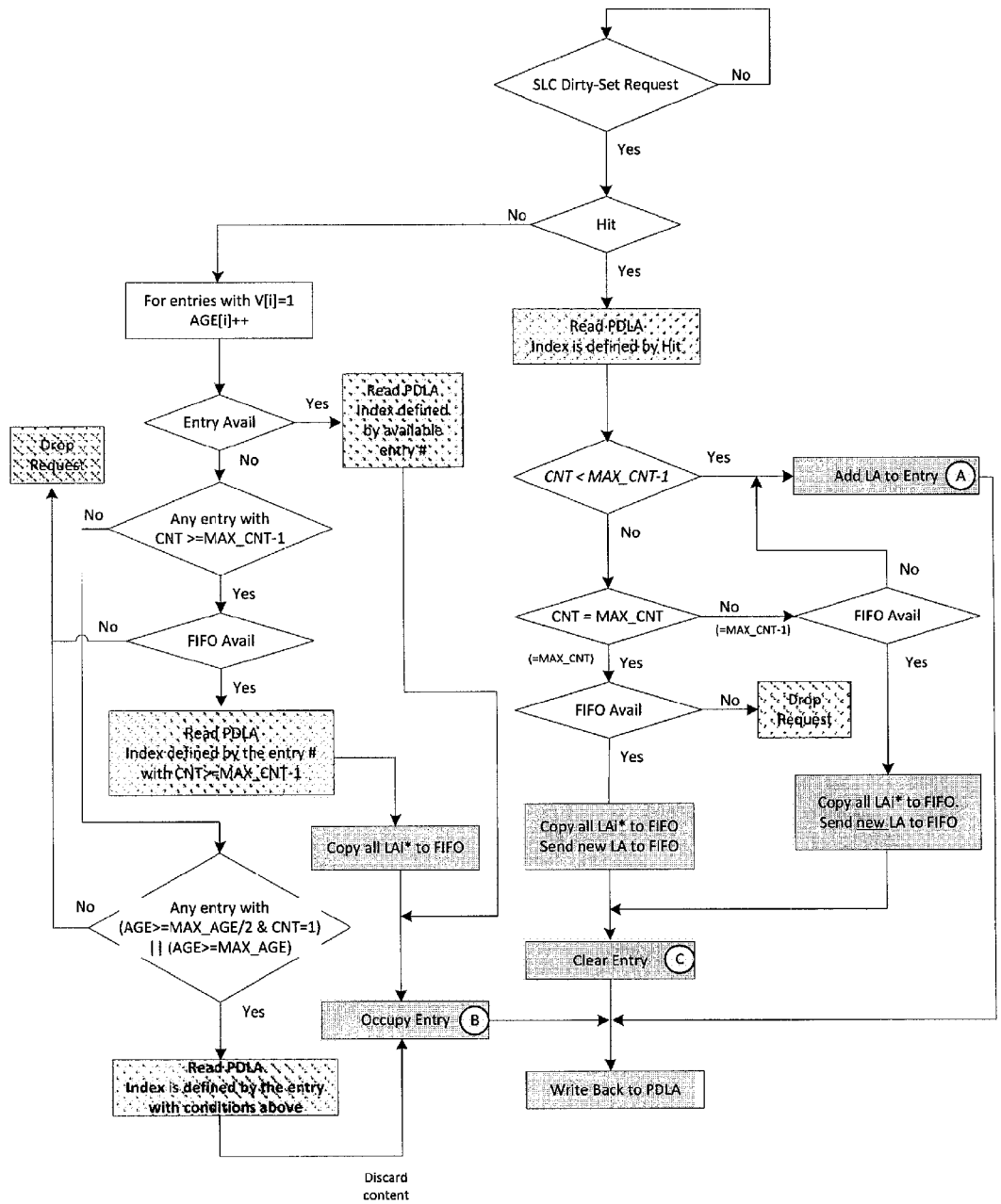
FIG. 11 is a flowchart showing an example of the DLL$ dirty-set request control flow.
Figure 12:
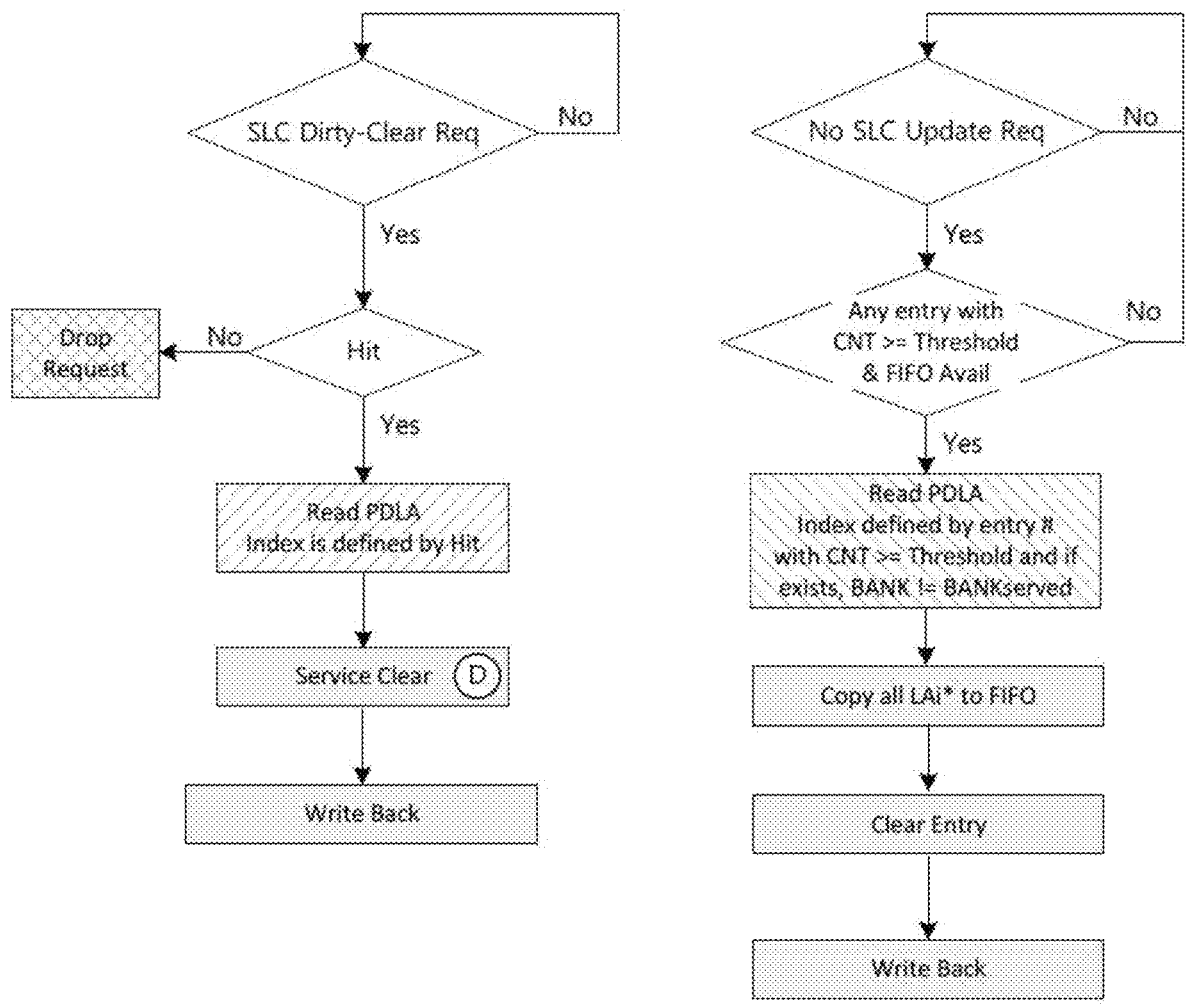
FIG. 12 is a flowchart showing the DLL$ dirty-clear and threshold control flow.

FIG. 11 is a flowchart showing an example of the DLL$ dirty-set request control flow and FIG. 12 is a flowchart showing the DLL$ dirty-clear and threshold control flow. The DLL$ is the cache of dirty cache line links, PDLA is the array of pointers to dirty CLs, MAX_CNT is the number of slots in the PDLA entry, BANK is the DDR bank address selected by an index, and BANDserved is the DDR bank address services by the FIFO in the SLC request control.

Based on the current state of DLL$ and incoming D-flag update information, the following operation may be performed. First, a hit may occur in which the page address is represented in the DLL$. When the D-flag is set, a new LA is added to the set of LA pointers for that entry (provided there is sufficient room). When the case of the D-flag is clear, the content of valid slots is sent to the FIFO, and the entry is cleared.

Clearing of the D-Flag is caused by either eviction or a flush. In both cases it is associated with the write to DDR. Therefore, if there are entries in the DLL$ pointing to the same DDR page, they can join this active write, thus improving DDR efficiency, as well as reducing SLC dirtiness.

Next is a miss, which is where a page address is not represented in the DLL$. When the D-flag is clear, nothing else is needed to be done in the DLL$. When the D-flag is set, a new PA address is allocated in the DLL$ provided there is an available entry.

If there is no any entry available, the DLL$ is checked for old (stale) entries, by analyzing their age. If an old entry is found, such entry is evicted and its information is discarded, and then this entry is allocated to the new PA address. If multiple entries are found, Bankddr information is compared to select the entry which has a different Bankddr address. Bankddr is encoded from the page address and also the SLC request control block sends the previously serviced Bankddr address to compare. If eviction is not possible, a new request is dropped.

After the DLL$ control identifies an entry number to work with and the operation to execute (FIG. 10), it reads the PDLA array using this entry number as the address. Based on the operation, the content of an addressed word is updated and it is written back.

As further shown in FIG. 11, there is a receiving of a system level cache (SLC) dirty-set request comprising a dirty set flag, a memory address, and an address of a cache line (LA) in a SLC data array. In addition, there is a converting of the memory address to a dynamic random-access memory (DRAM) page address (PA) which identifies a DRAM bank and a DRAM page and identifying of either a hit, or no hit, is present according to whether the DRAM PA matches with PA address in any valid entry in a dirty line links cache (DLL$).

Figure 13:
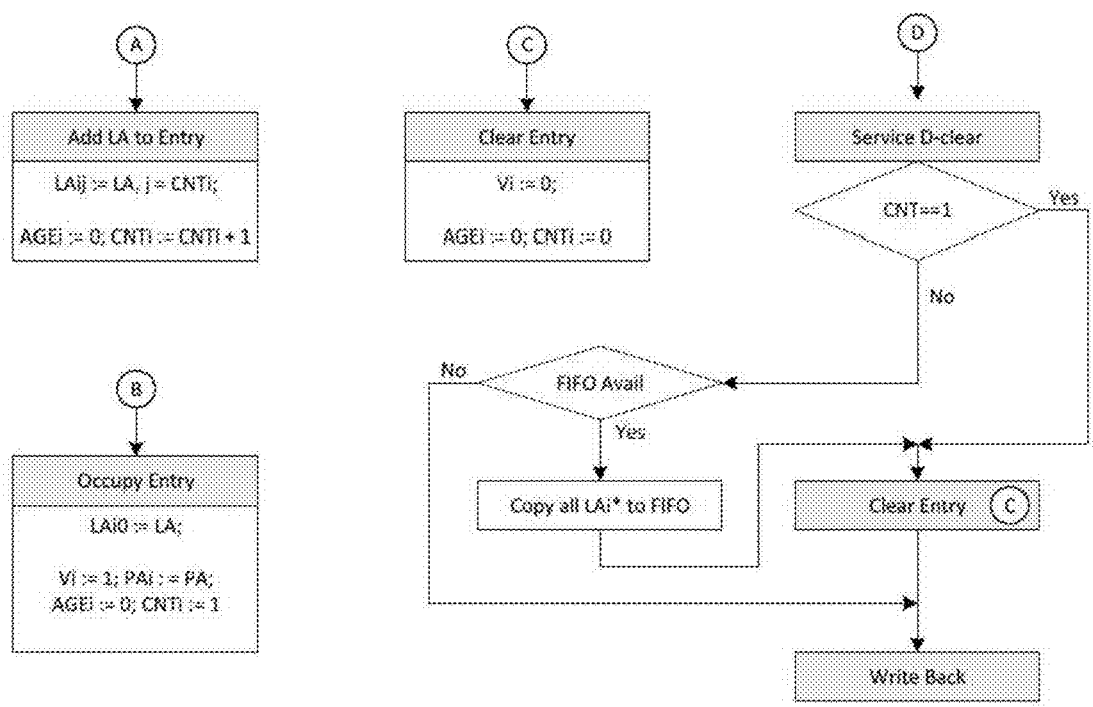
FIG. 13 depicts cases of an entry state update originating from operations of FIGS. 11 and 12.

FIG. 13 depicts cases of an entry state update originating from operations of FIGS. 11 and 12. In FIG. 13, four operations are shown. Specifically, case A is to add a new LA to the set of LA pointers in the entry, case B is to occupy the entry (e.g., new PA and LA are put into an available entry), case C is to clean the entry (e.g. clear entry's valid bit, age and counter), and case D (flush the entry into FIFO as the result of D-flag clear request, then clean the entry).

In the absence of D-Flag update signals from the SLC, the DLL$ control checks the CNT values of the entries and compares it with the value in the PDTHLD register. The first entry with its CNT exceeding threshold is flushed to the FIFO, provided there is room, then the entry is cleaned and becomes available for allocation. Once the FIFO becomes not empty it generates a flush request to the arbiter. The urgency of this request is 0—the same as non-urgent request from a threshold-based engine.

In sum the flowcharts of FIGS. 11 and 13 show how the DLL$ is updated and the flush requests are generated. "MAX_CNT" in these figures may be defined by the capacity of an entry in the PDLA array (e.g., FIG. 9 where it is shown as M), and "Threshold" may be defined by the value in PDTHLD register.

Figure 14:
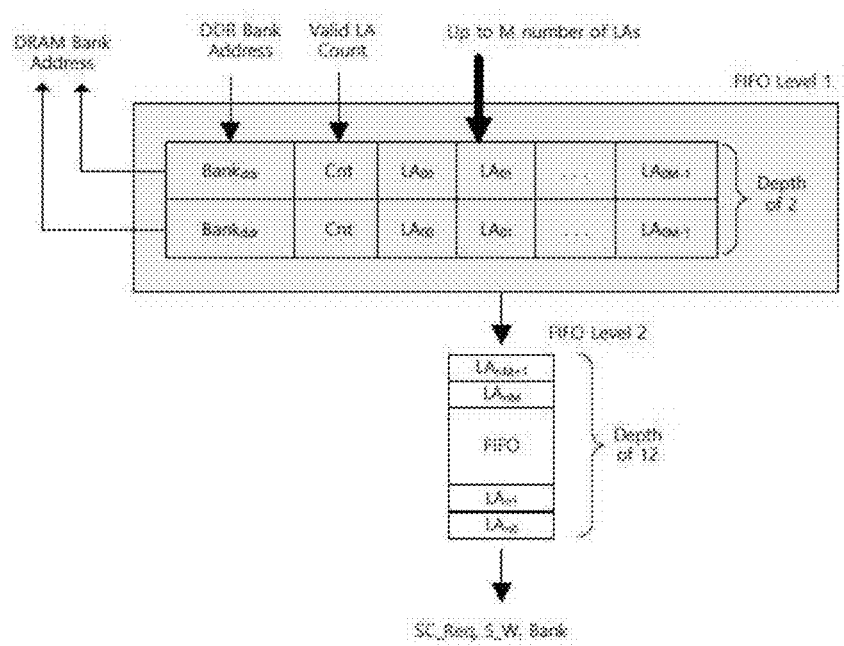
FIG. 14 is a block diagram providing an example of SLC request control.

FIG. 14 is a block diagram providing an example of SLC request control. For instance, the SLC Request Control generally includes FIFO blocks. The PDLA block of the DLL$ sends a flush request with a number of line addresses which belong to the same PDLA slot. This module has two levels of FIFO. The first FIFO has multiple input entries to receive up to M number of line addresses which belong to the same PDLA slot and one output entry to generate a single flush request for a line address (SET+WAY+BANKslc). The BANKslc refers to one of the four encoded bank address of a SLC cluster.

In addition, the first level FIFO receives the BANKddr address which is the bank address of the DDR memory device. This BANKddr information is sent back to the DLL$ module and is used to select an index of PDLA slots that has a different DDR bank address. This operation facilitates the DDR memory controller scheduling its memory requests and is generally not needed to generate memory requests in a sequential manner as consecutive DDR access which have the same bank address cannot be overlapped.

FIG. 15 depicts a table showing self-clean (SC) registers in offset order from the base memory address. In some embodiments, the SC engine registers occupy a 1 KB region, which allows up to 256 32-bit registers. The relative address (offset) of the registers may use 8 bits. In describing the type of register, R/W is a read and write, RAZ is read as zero, and WI is write ignored.

FIG. 16 is a table showing an example of register interface signals. These interface signals come from an external block that receives register access requests through the APB bus and transform them to the signals shown in the table.

FIG. 17 is a table that depicts examples of DRAM memory address configurations that may be implemented in an embodiment of the present invention. FIG. 18 is a table that depicts examples of SLC observation signals that may be implemented in an embodiment of the present invention. Signals shown in FIG. 18 come from the SLC Core. The Slc_d update, which is a valid signal for others, is generally asserted for 1 cycle.

FIG. 19 is a table that depicts examples of flush request interface signals that may be implemented in an embodiment of the present invention.

FIG. 20 is a table that depicts examples of self-clean event signals that may be implemented in an embodiment of the present invention. More specifically, the self-clean engine may provide an event signal, called for example 'sc_events', to monitor its operation. This event signal can be connected to SLC event counter to be read from software, if so desired.

It is understood that bandwidth requirements in mobile devices are every increasing. High speed or wide DRAM interfaces are often challenging to apply to mobile devices. Therefore, increasing the efficiency of the DRAM interface is becoming increasingly desirable. Write-to-read and read-to-write switching on a bus requires delay in the system and usually decreases the efficiency of the DRAM. Another improvement in the DRAM interface efficiency may be accomplished when there are several back-to-back accesses to the same DRAM page.

Various techniques may be used to improve DRAM efficiency through reducing DRAM bus switching and arranging sequential accesses to the data in the same DRAM page. This is usually addressed in the DRAM controller, but information about memory requests that DRAM controllers can observe is often limited by the size of their queues. This technique is also a "passive" one, in that the controllers function according to the requests which they receive.

As described herein, an apparatus utilizes Last Level Cache (LLC), or System Level Cache (SLC), to defer system writes and not passing them to DRAM once they are received, thus letting reads to proceed. The stream of writes to DRAM out of the SLC is then initiated such that the selected writes can be executed in the most efficient way.

When caches are used and a miss happens, new data is allocated in the cache, while old data is evicted. If old data is not modified (clean), eviction usually does not cause any additional action. However, if old data is modified in the cache (dirty) and is not in DRAM, old data need to be written back to the DRAM prior to new data being stored in the cache. This may cause a delay in executing missed reads. Therefore it is useful to have the ability to select clean cache blocks for eviction using, for example, various techniques set out in the specification.

Figure 21:
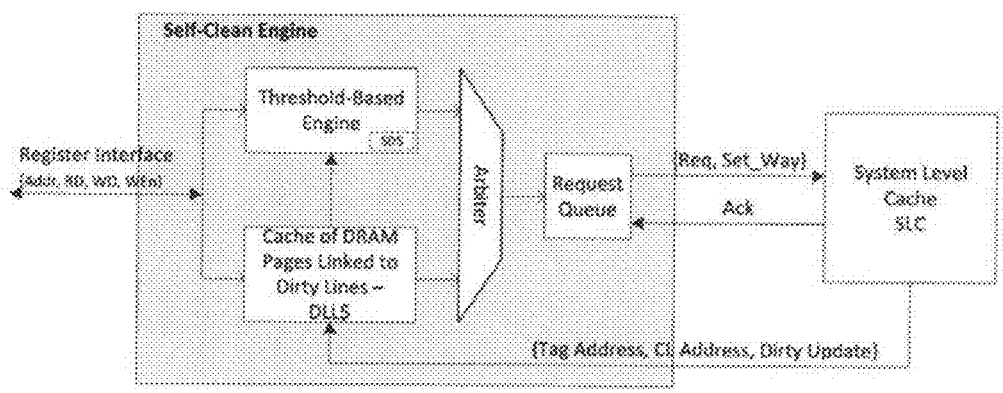
FIG. 21 is a block diagram of a self-clean engine (SCE) in accordance with another embodiment of the present invention.

FIG. 21 is a block diagram of a self-clean engine (SCE) in accordance with another embodiment of the present invention. The SCE of this figure may be implemented to work in the background of main operations of a Last Level Cache (LLC), or System Level Cache (SLC). This engine observes the system write requests and SLC write back operations, and tracks the dirtiness of SLC. Based on programmable or other criteria it can initiate flush requests to the cache and clean (through writing back to the DRAM) selected cache blocks.

A typical self-clean engine can address assorted issues. One is that the engine allows allocation (replacement) logic to find non-dirty cache blocks in a set. This feature allows the engine to avoid the write-to-read and read-to-write switching on the DRAM bus, and also permits the avoiding of a write back at an inconvenient or undesirable time (e.g., when a read miss occurs).

A second issue addressed by the self-clean engine is that it groups several writes to the same page in order to achieve, for example, an increase in DRAM efficiency. Fewer memory bus turnarounds and higher DRAM page utilization allows for an increase in DRAM interface efficiency, and also reduces device power consumption through decreasing power on the memory bus and inside the DRAM chips.

When a certain number of dirty cache lines which have the same DRAM page address is detected, the SCE may start issuing flush requests to the cache for the group of such dirty cache lines. In addition, the SCE keeps track of the dirty status for all cache lines LLC/SLC. When the number of dirty cache lines in a set exceeds a threshold value, the SCE may randomly or otherwise select one of the dirty cache lines and issue a flush request to the cache.

Dirty Line Links Cache (DLL$) stores information on DRAM page addresses associated with dirty cachelines in the SLC. When the number of dirty cachelines pointing to the same DRAM page reaches specified value, it initiates flush requests to the SLC. This operation causes sequential writes from the SLC to DRAM with addresses targeting the same DRAM page.

FIG. 21 shows a threshold-based engine recording and updating whenever the dirty state of each cacheline is changed in the SLC. A threshold-based engine receives dirty clear or set status information for a set alongside its set address. If the number of dirty cachelines in the set exceeds the threshold value configured by the user, for example, one of the dirty ways in the set is chosen by random selection logic and a flush request is issued.

When there is no activity on a dirty state update, a Set Dirty Status (SDS) mechanism is placed into operation. This block keeps monitoring every set in the SLC, which has a greater number of dirty ways than the configured value. If there is no dirty state update received from SLC, the SDS randomly selects one of the sets with a certain number of dirty ways. This set address is sent to the threshold-based engine and the threshold-based engine randomly picks up one of the dirty ways in the set to flush out.

Embodiments of the invention presented herein may be implemented to provide configurable aggressiveness on issuing flush requests to the SLC by programmed threshold values and Dirty Lines Links Cache, DLL$, which collects the information about the SLC dirty cache lines which point to the same DRAM page. The DLL$ adaptively issues flush requests according to its usage of storage to maximize the usage of the limited size of the DLL$. Another feature is the understanding of the DRAM controller scheduling mechanism and address map to maximize DRAM controller efficiency on page address utilization and DRAM bank parallelism.

Various embodiments described herein may be implemented in a computer-readable medium, a machine-readable medium, or similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

Various embodiments of the present invention have been described, but still further features may alternatively or additionally be implemented in accordance with alternative embodiments of the present invention. Although embodiments may be implemented using the exemplary series of operations described herein (e.g., in conjunction with the various flowcharts discussed above), additional or fewer operations may be performed.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

MODE FOR THE INVENTION

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As described above, the present invention is totally or partially applicable to control circuitry.

The invention claimed is:

1. A device comprising:
   a processor;
   a non-transitory memory; and
   one or more programs stored in the non-transitory memory, which, when executed by the processor, cause the processor to be configured to perform:
   receiving a system level cache (SLC) dirty-set request corresponding to an entry in a dirty line links cache, wherein the SLC dirty-set request comprises a dirty set flag, a memory address, and an address of a cache line, wherein the dirty line links cache is organized as an array of entries such that each entry is associated with a single dynamic random-access memory (DRAM) page and the entry stores a page address and a set of SLC cache line addresses, wherein the set of SLC cache line addresses point to a same DDR page;
   converting the memory address to a DRAM page address identifying a DRAM bank and a DRAM page;
   identifying an entry hit or an entry miss in the dirty line links cache based on whether the DRAM page address matches with a physical address in any slots in the dirty line links cache wherein the entry hit corresponds to when the page address is represented in the dirty line links cache and the entry miss corresponds to when the page address is not represented in the dirty line links cache; and
   adding the address of the cache line of the SLC dirty-set request to the entry in the dirty line links cache based on the entry hit being identified and a count value of the hit entry being less than a predefined number minus 1.

2. The device of claim 1, further comprising one or more programs stored in the non-transitory memory, which, when executed by the processor, further causes the processor to be configured to perform
   occupying an entry in the dirty line links cache comprising an age greater than a specified max value age based on:
   the entry miss being identified;
   there being no available slot in the dirty line links cache for the entry; and
   there being entries in the dirty line links cache with a count less than a predefined number.

3. The device of claim 2, further comprising one or more programs stored in the non-transitory memory, which, when executed by the processor, further causes the processor to be configured to perform discarding the SLC dirty-set request based on:
   the entry miss being identified;
   there being no available slot in the dirty line links cache for the entry;
   there being entries in the dirty line links cache with the count less than the predefined number minus 1; and
   there being either no entry in the dirty line links cache comprising an age greater than a specified max age value (MAX_AGE) or there being no entry with the count (CNT) equal to 1 and an age greater than MAX_AGE/2.

4. The device of claim 3, further comprising one or more programs stored in the non-transitory memory, which, when executed by the processor, further causes the processor to be configured to perform discarding the SLC dirty-set request based on:
   the entry miss being identified;
   there being no available slot in the dirty line links cache for the entry;
   there being an entry in the dirty line links cache with the count greater than or equal to the predefined number minus 1, and a first in first out (FIFO) is not available.

5. The device of claim 4, further comprising one or more programs stored in the non-transitory memory, which, when executed by the processor, further causes the processor to be configured to perform, copying content of a corresponding entry of the dirty line links cache entry to the FIFO and occupying the corresponding entry of the dirty line links cache, wherein the copying and occupying is based on:
   the entry miss being identified;
   there being no available slot in the dirty line links cache for the entry 1-5,
   there being an entry in the dirty line links cache with a count greater or equal, to the predefined number minus 1, and
   the FIFO is available.

6. The device of claim 5, further comprising one or more programs stored in the non-transitory memory, which, when executed by the processor, further causes the processor to be configured to perform
   occupying an available slot in the dirty line links cache for the entry based on:
   the entry miss being identified; and
   identifying the available entry in the dirty line links cache for the corresponding entry of the dirty line links cache.

7. The device of claim 1, further comprising one or more programs stored in the non-transitory memory, which, when executed by the processor, further causes the processor to be configured to perform:
   adding the address of the cache line of the SLC dirty-set request to a corresponding entry of the dirty line links cache based on:
   the entry hit being identified;
   the count value of the hit entry being equal to the predefined number minus 1; and
   a FIFO not being available.

8. The device of claim 7, further comprising one or more programs store in the non-transitory memory, which when executed by the processor, further causes the processor to be configured to perform:
   copying content of the corresponding entry of the dirty line links cache to the FIFO, sending the cache line of the SLC dirty-set request to the FIFO, and clearing the entry of the dirty line links cache, wherein the copying, the sending, and the clearing is based on:
   the entry hit being identified;
   the count value of the hit entry being equal to the predefined number minus 1; and
   the FIFO being available.

9. The device of claim 8, further comprising one or more programs stored in the non-transitory memory, which, when executed by the processor, further causes the processor to be configured to perform:
   discarding the SLC dirty-set request and clearing the corresponding entry based on:
   the entry hit being identified;
   the count value of the hit entry being equal to the predefined number; and
   the FIFO not being available.

10. The device of claim 9, further comprising one or more programs stored in the non-transitory memory, which, when executed by the processor, further causes the processor to be configured to perform:
   a second copying content of the entry of the dirty line links cache to the FIFO, a second sending the cache line of the SLC dirty-set request to the FIFO, and a second clearing the entry of the dirty line links cache, wherein the second copying, the second sending, and the second clearing is based on:
   the entry hit being identified;
   the count value of the hit entry being equal to the predefined number; and
   the FIFO being available.

11. The device of claim 10, further comprising one or more programs stored in the non-transitory memory, which, when executed by the processor, further causes the processor to be configured to perform:
   clearing the entry of the dirty line links cache based on the entry hit being identified; and
   the count of the hit entry being 1.

12. The device of claim 11, further comprising one or more programs stored in the non-transitory memory, which, when executed by the processor, further causes the processor to be configured to perform:
   copying content of the entry of the dirty line links cache to the FIFO and clearing the entry of the corresponding entry of the dirty line links cache based on:
   the entry hit being identified;
   the count of the hit entry being greater than 1, and
   the FIFO being available.

13. The device of claim 12, further comprising one or more programs stored in the non-transitory memory, which, when executed by the processor, further causes the processor to be configured to perform:
   analyzing counter values of entries of the dirty line link cache when there are no SLC requests, wherein the device is further configured to perform copying content of the entry of the dirty line links cache and clearing the entry of the dirty line link cache based on:
   an entry being found with a count that is equal or greater than the predefined number, and
   the FIFO being available.

14. The device of claim 12, further comprising one or more programs stored in the non-transitory memory, which, when executed by the processor, further causes the processor to be configured to perform:
   incrementing an age of an entry in the dirty line links cache based on the entry miss being identified.

15. The device of claim 7, wherein each entry of the dirty line links cache comprises at least a parameter for age, th count, the page address, and an address of the cache line, and wherein the adding the address of the cache line includes incrementing the count (CNT) or clearing the age.

16. The device of claim 12, wherein each entry of the dirty line links cache comprises at least a parameter for age, the count, the page address, and an address of the cache line, and wherein the clearing the entry of the dirty line links cache includes: setting the entry as not occupied, resetting the age, and setting the count to 1.

17. A device comprising:
a processor;
a non-transitory memory; and
one or more programs stored in the non-transitory memory, which, when executed by the processor, cause the processor to be configured to perform:
receiving a system level cache (SLC) dirty-clear request corresponding to an entry in a dirty line links cache, wherein the SLC dirty-clear request comprises a dirty clear flag, a memory address, and an address of a cache line, wherein the dirty line links cache is organized as an array of entries such that each entry is associated with a single dynamic random-access memory (DRAM) page and the entry stores a page address and a set of SLC cache line addresses, wherein the set of SLC cache line addresses point to a same DDR page;
converting the memory address to a DRAM page address identifying a DRAM bank and a DRAM page;
identifying an entry hit or an entry miss in the dirty line links cache based on whether the DRAM page address matches with a physical address in any slots in the dirty line links cache, wherein the entry hit corresponds to when the page address is represented in the dirty line links cache and the entry miss corresponds to when the page address is not represented in the dirty line links cache; and
discarding the system level cache (SLC) dirty-clear request based on the entry miss being identified.

* * * * *